United States Patent [19]

Suzuki

[11] Patent Number: 5,301,383
[45] Date of Patent: Apr. 12, 1994

[54] ACTUATING MECHANISM HAVING AN EXTENDIBLE WIPER BLADE

[75] Inventor: Kazuhiro Suzuki, Nishinomiya, Japan

[73] Assignee: Nippon Cable System Inc., Hyogo, Japan

[21] Appl. No.: 31,083

[22] Filed: Mar. 8, 1993

Related U.S. Application Data

[63] Continuation of Ser. No. 529,424, May 29, 1990, abandoned.

[30] Foreign Application Priority Data

Jun. 1, 1989 [JP] Japan ................... 1-140574

[51] Int. Cl.$^5$ ............ B60S 1/36; B60S 1/70
[52] U.S. Cl. .......... 15/250.23; 15/250.25; 15/250.41; 74/89.22; 254/266
[58] Field of Search ......... 15/250.21, 250.24, 250.25, 15/250.23, 250.39, 250.3, 250.12, 250.35, 250.41; 74/89.22, 89.2; 254/264, 266

[56] References Cited

U.S. PATENT DOCUMENTS

| | | | |
|---|---|---|---|
| 2,494,408 | 1/1950 | Rice, Jr. | 15/250.25 |
| 2,598,709 | 6/1952 | Morris | 74/89.22 |
| 2,617,315 | 11/1952 | McCelland | 15/250.23 |
| 2,629,891 | 3/1953 | Greene | 15/250.23 |
| 3,047,900 | 8/1962 | Scinta | 15/250.31 |
| 3,087,343 | 4/1963 | Wubbe | 74/89.22 |
| 3,388,604 | 6/1968 | McFarland et al. | 74/89.22 |
| 4,440,354 | 4/1984 | Kobayashi et al. | 74/89.22 |
| 4,639,966 | 2/1987 | Kuhbach | 15/250.23 |
| 4,813,095 | 3/1989 | Sato | 15/250.24 |
| 4,815,159 | 3/1989 | Kuhbach | 15/250.21 |
| 4,957,014 | 9/1990 | Burke | 74/89.22 |

FOREIGN PATENT DOCUMENTS

| | | | |
|---|---|---|---|
| 2430831 | 1/1976 | Fed. Rep. of Germany | 15/250.23 |
| 2942739 | 5/1981 | Fed. Rep. of Germany | 15/250.12 |
| 3220501 | 12/1983 | Fed. Rep. of Germany | 15/250.21 |
| 804428 | 8/1936 | France | 15/250.23 |
| 0071744 | 4/1987 | Japan | 15/250.35 |
| 0068445 | 3/1988 | Japan | 15/250.35 |
| 63-141857 | 6/1988 | Japan . | |
| 63-215450 | 9/1988 | Japan . | |

Primary Examiner—Harvey C. Hornsby
Assistant Examiner—Gary K. Graham
Attorney, Agent, or Firm—Armstrong, Westerman, Hattori, McLeland & Naughton

[57] ABSTRACT

A window wiper comprising an arm having an end rotatably mounted near a window glass, a sliding member supporting a reciprocally slidable along the arm, a loop-like control cable connected to the sliding member, a mechanism for actuating the arm to reciprocally rotate, and a mechanism for actuating the control cable to reciprocally slide the sliding member in synchronization with the motion of the arm, whereby the window glass can be swept with a single arm.

6 Claims, 9 Drawing Sheets

ACTUATING MECHANISM HAVING AN EXTENDIBLE WIPER BLADE

This application is a continuation of application Ser. No. 07/529,424 filed May 29, 1990, now abandoned.

BACKGROUND OF THE INVENTION

The present invention relates to a window wiper and a wiper actuating mechanism, and more particularly, to a wiper for wiping a surface of a glass of window of an automobile, an construction equipment, and the like, and to a mechanism for actuating the wiper.

Recently, a windshield of an automobile for riding tends to be provided with more inclined slope in order to satisfy user's requirement in style of the automobile. However, when the windshield becomes so inclined and extended in the length (from the top to the bottom) that the ratio of the width to the length becomes to about two, the upper portion of the windshield cannot be wiped by a usual double arms wiper in which two arms and rubber blades wipe respective fan-shaped areas. Therefore, a single arm wiper having only one arm and blade is recently proposed for suitably wiping the inclined windshield.

The wiper includes an arm, and the lower end of the arm is rotatably supported near the lower center of the windshield. Therefore, a semi-circular area from the left and right lower corners to the upper center portion of the glass pane can be sufficiently wiped with the rubber blade. However, the upper corner areas in the both sides are left off without being wiped.

Then, there has been proposed a single arm wiper having a special arm capable of extending in accordance with the angular position thereof. That is to say, the arm extends to sweep the upper corners of the windshield when the arm comes to the angles corresponding to the corners.

Figure 10:
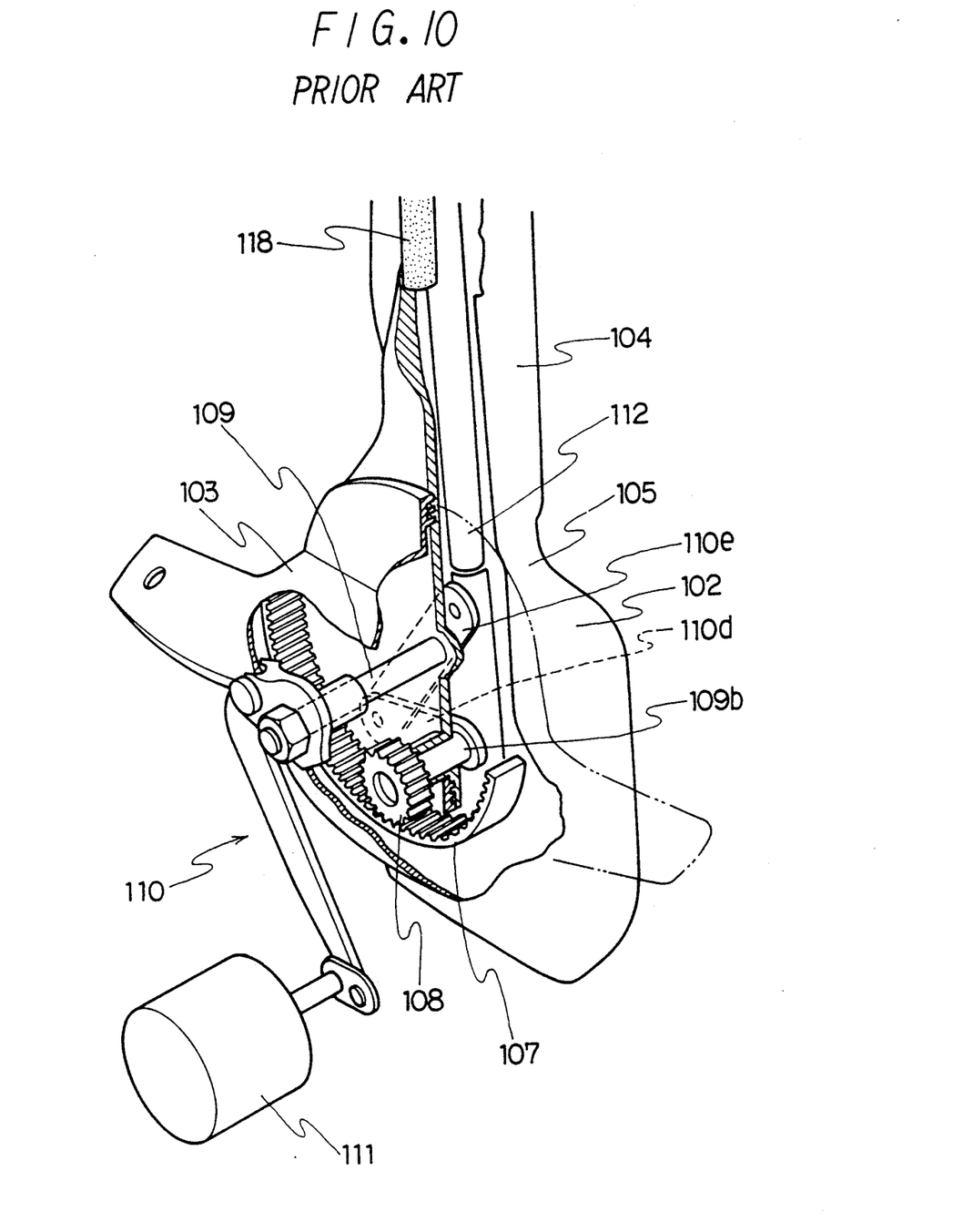
FIG. 10 is a pertially-broken-away perspective view showing an example of a conventional window wiper.

For example, a wiper shown in FIG. 10 has a disk-like base member 103 fixed to a body of an automobile at the lower side thereof, and the base member 103 rotatably supports a shaft 109 fixed to a lower end 105 of an arm 104. The base member 103 is provided with a semi-circular internal gear 104 at the inside thereof. Further, the shaft 109 is driven to rotate reciprocally by a motor 111 which rotates in a certain direction, through a crank mechanism 110.

Further, the lower end 105 of the arm 104 carries a pinion 108 engaging with the internal gear 107, and the pinion is rotatably mounted on an eccentric position sifted from the rotational center of the arm 104.

In addition, a sliding member 112 is slidably mounted along the arm 104. A link 110d is fixed to a shaft 109b of the pinion 108 at an end thereof, while another end of the link 110d is connected with the abovementioned sliding member 112 through another link 110e.

In the instant single arm wiper of FIG. 10, when the motor 111 continuously rotates in a direction, the arm 104 is reciprocally rotated over a semi-circular area. In addition, the pinion 108 roles on the internal gear 107, and the rotary motion of the pinion 108 causes reciprocal sliding motions of the sliding member 112 through the links 110d and 110e.

The above-mentioned conventional link-type wiper is complex in construction and heavy. Further, since the wiper is large, a large space is necessary for containing the wiper.

Further, the reciprocal motion of the wiper is based on a quadric crank chain mechanism, the angular speed becomes to the maximum near the center of the windshield. Therefore, water drops splash on walkers due to centrifugal force.

A main object of the present invention is to delete the above-mentioned problems and to provide a window wiper which is light and small so that space-saving design is easy, and in which the splashing of rain drops can be prevented.

Another object of the present invention is to provide a wiper actuating mechanism adapted to drive the arm and blade of such wipers with reciprocal rotations or reciprocal sliding motions.

SUMMARY OF THE INVENTION

In accordance with the present invention, there is provided a window wiper comprising an arm having an end rotatably supported near a window glass, a sliding member mounted on the arm in slidable manner along the arm, a wiper blade fixed to the sliding member, a control cable having a conduit supported on the arm in a loop-like arrangement and an inner core slidably guided in the conduit, a reciprocal rotary actuating mechanism for actuating the arm to reciprocally rotate, and a slide-actuating mechanism for reciprocally driving the inner core of the loop-like control cable, wherein the slide-actuating mechanism and the rotary actuating mechanism are harmonized with each other so that the sliding member extends when the arm is directed toward a corner of the window glass.

Further, in the above-mentioned wiper, the speed of the reciprocal rotary actuating mechanism is preferably controlled so that the angular speed of the arm is substantially constant.

In addition, when the arm has a static blade, further to the movable blade, a wide region around the rotary center of the arm can be advantageously wiped.

The above-mentioned reciprocally rotating mechanism can comprise a first pulley fixed to a rotary shaft of the arm, a second pulley reciprocally rotated with an electric motor and a reduction gear, and a control cable arranged between the first and second pulleys.

Further, the above-mentioned sliding mechanism can be constructed from a pulley wrapped with the inner core therearound and a reciprocally rotatable electric motor for reciprocally driving the pulley.

The wiper actuating mechanism of the present invention comprises a motor for reciprocally actuating a movable member of a wiper, a detector for detecting both stroke-ends of the movable member, and a control means for making regenerative braking of the motor and for changing poles of power source of the motor on receipting stroke-end signals from the detector.

In such a wiper actuating mechanism, a time-adjustable timer for shifting the period of the regenerative braking for the motor from the period when the detector detects the stroke-ends.

When the above-mentioned wiper actuating mechanism is used for actuating the wiper arm, it is preferable to use another detector for detecting parking position of the wiper arm in addition to a detector for detecting stroke-ends of the wiper arm, and a change-over switch for alternatively selecting the stroke-end detector and the parking position detector. The "parking position" means a position where the wiper arm is housed in a space in a bonnet or hood of an automobile when the wiper is not used.

Further, in accordance with another aspect of the present invention, there is provided a wiper actuating mechanism comprising (a) a first motor causing reciprocal rotation of a wiper arm and a second motor causing reciprocal sliding motion of a wiper blade, wherein (b) the first motor has electrodes connected with power lines which change polarity each other every time the stroke-ends are detected, and (c) the second motor has electrodes connected with the power lines of the first motor via a switch which changes ON-OFF thereof in accordance with angular position of the wiper arm so that direction for expansion-retraction motions of the wiper blade is changed in accordance with the direction of the rotation of the wiper arm.

In the window wiper of the present invention constructed as mentioned above, when the motor of the reciprocal rotary mechanism reciprocally rotates, the arm is driven to swing around an end thereof through the above-mentioned another control cable wrapping around the pulley fixed on the rotary shaft of the arm. On the other side, the sliding member is synchronized with the motion of the arm. That is to say, the loop of the inner core of the control cable is driven so as to extend the sliding member to the maximum extended position when the arm is directed to the corners of the window glass, for example, at angular positions corresponding to $\frac{1}{8}$, $\frac{3}{8}$, $\frac{5}{8}$ and $\frac{7}{8}$ cycles of one cycle of the arm.

Therefore, the blade performs a combined motion of the reciprocal swing motion of the arm and the reciprocal sliding motion of the sliding member, and an almost rectangular area including both upper corners of the windshield is well swept over.

In addition, since the swing motion of the arm is driven, through a control cable or directly, by a motor (or a motor with a reduction gear) without employing a quadric chain mechanism, the angular speed of the arm or the top end of the blade can be controlled at an almost constant level. As a result, the maximum speed can be reduced in comparison with conventional link-type wipers. Therefore, there is no disadvantage that rain drops splash over and wet walkers.

Further, since the sliding member is connected to the sliding actuating mechanism via flexible or yieldable control cables, the sliding actuating mechanism can be fixed at an optional position separated from the arm. Then the arm is connected only to the control cable which is light and occupies no excess space, and therefore, the arm can smoothly move.

In a preferable embodiment where an additional non-slidable blade is fixed to the arm, the lower center area of the windshield can be well swept.

Hereinafter, preferable embodiments of the window wiper and the wiper actuating mechanism of the present invention are described in detail with reference to the accompanying drawings.

DETAILED DESCRIPTION OF THE INVENTION

Figure 1:
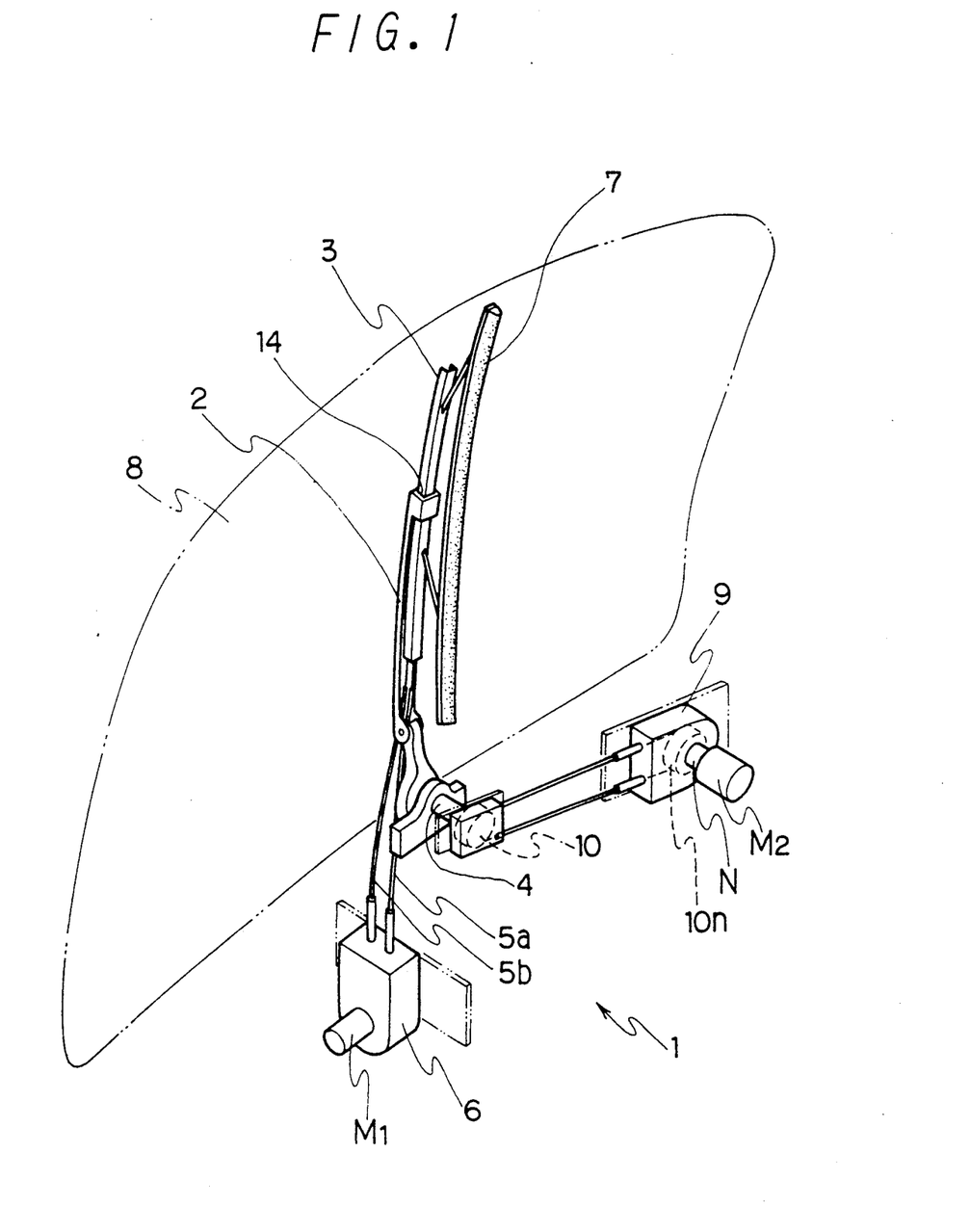
FIG. 1 is a perspective view showing an embodiment of the window wiper of the present invention.
Figure 2:
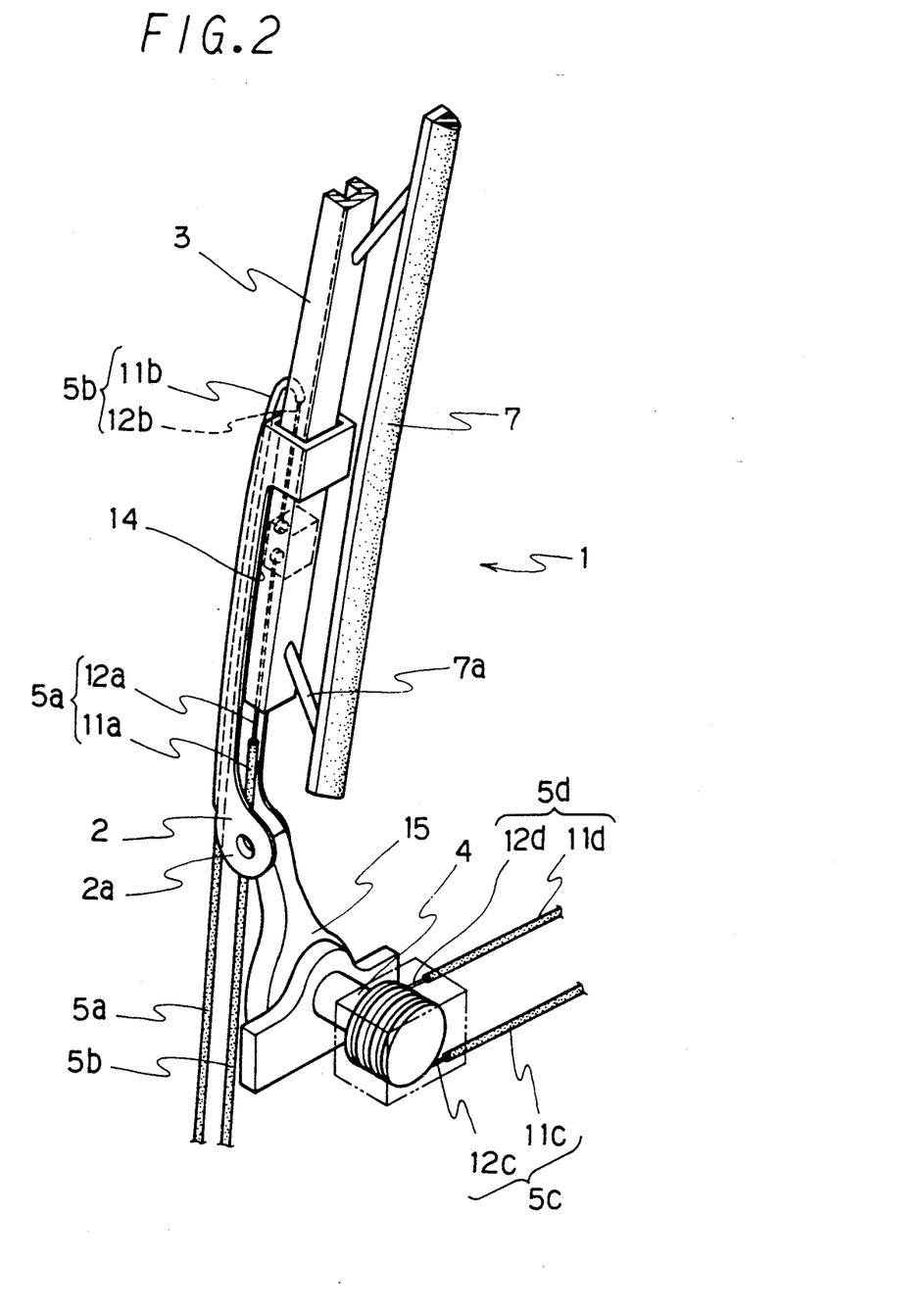
FIG. 2 is an enlarged perspective view showing an essential part of the wiper of FIG. 1.

Referring to FIGS. 1 and 2, whole construction of a window wiper is explained.

Hereinafter, several embodiments of a single-arm wiper for wiping a windshield of an automobile are explained as typical cases. However, it is to be understood that the present invention is not limited to the embodiments, and the wiper of the present invention can be applied to various type of wipers, for example a wiper device having two wipers (each wiper has a sliding member), a single arm wiper used at a slanted rear window of a hach-back type car.

The wiper 1 of FIGS. 1 and 2 has an arm 2 fixed to a rotary shaft 4 which is rotatably supported on a body of an automobile near the center bottom portion of a windshield 8. The arm 2 is provided with a known hinge 2a at a root portion thereof.

The arm 2 is provided with an open groove 14 at the inside thereof, and a bar-like sliding member 3 is slidably inserted in the groove 14. On the outside surface, which is not in contact with the arm 2, of the sliding member 3, a wiper blade 7 is detachably mounted through a spring 7a.

Further, the arm 2 has an open groove partially containing and fixing two control cables 5a, 5b, which are arranged to substantially form a closed loop.

Each control cable comprises a known conduit 11a, 11b and an inner core 12a, 12b inserted through the conduit. Each end of the inner core projecting from the conduit is anchored to the sliding member 3.

One of the conduit 11a is fixed at the lower end portion of the arm 2 so that the end is directed upward and the conduit extends downward, while another conduit 11b is folded for 180°, looped around an upper portion of an arm 2, and fixed at the upper portion of the arm 2 so that the end is directed downward.

As mentioned above, the root portion or base end 15 of the arm 2 is connected to the rotary shaft 4 which is rotatably mounted on a position near the center bottom of the windshield.

A sliding actuating mechanism 6 for reciprocally circulating the loop of the inner cores 12a, 12b is mounted at a position about the center bottom of the windshield 8, and the mechanism 6 is connected with the control cables 5a, 5b. The sliding actuating mechanism 6 is driven by a motor M1 capable of reciprocally rotating.

The reciprocal rotating or swing motion of the arm 2 and the reciprocal sliding motion of the sliding member 3 are electrically synchronized with each other so that the sliding member 3 extends at $0\frac{1}{8}$, $\frac{1}{4}\text{-}\frac{3}{8}$, $\frac{1}{2}\text{-}\frac{5}{8}$ and $\frac{3}{4}\text{-}\frac{7}{8}$ cycle of the full cycle (go and return) of the arm, and retracts at $\frac{1}{8}\text{-}\frac{1}{4}$, $\frac{3}{8}\text{-}\frac{1}{2}$, $\frac{5}{8}\text{-}\frac{3}{4}$, $\frac{7}{8}\text{-}1$ cycle as mentioned after in detail.

Hereinafter, an reciprocally rotary actuating mechanism for the arm is explained.

A reciprocally rotating motor M2 is mounted on a body of an automobile or the like at a position separated from the pulley 10 with a distance, and another pulley 10n is fixed to a rotary shaft of the motor M2 through a reduction gear N. Further the pulleys 10, 10n are mutually connected through two control cables 5c, 5d arranged so as to form a substantially closed loop. Each control cable comprises a conduit 11c, 11d and an inner core 12c, 12f inserted through the conduit, and each end of the inner core is anchored to the abovementioned pulley 10, 10n.

The pulleys 10, 10n, the control cables 5c, 5d and the reciprocal rotatable motor M2 totally construct a reciprocal rotary actuating mechanism for the arm 2. As an alternative case, the shaft 4 can be directly connected to the reduction gear or the motor M2 (see FIG. 8).

Figure 3:
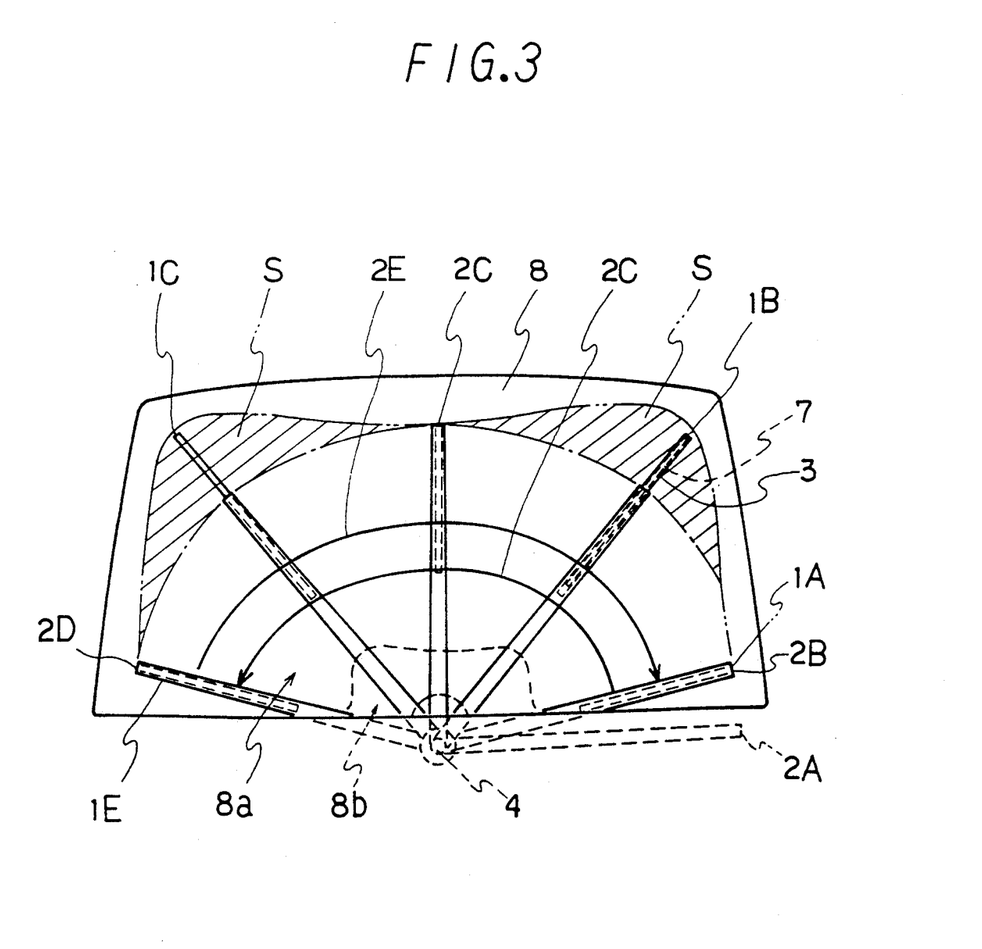
FIG. 3 is an illustration showing motions of the wiper of FIG. 1.

Hereinafter, referring to FIG. 3, motion of the wiper 1 is explained. FIG. 3 shows the appearance from the outside of an automobile.

When the wiper does not operate, the arm 2 is contained in a bonnet or hood of the automobile and is in a parking position 2A.

The wiper of the present invention is not a type of device which performs a reciprocating motion through a link mechanism, but is a device in which an arm 2 is reciprocally driven by repeating a cycle comprising ordinary rotation (-stop)-return(-stop) of the motor by changing polarity of the power current for the motor.

When the motor M2 rotats in the ordinary direction, the arm 2 is also moved in the ordinary direction from a parking position 2A to a start position 2B, and further to a returning position 2D as shown by an arrow 2C in FIG. 3. When the arm 2 reaches the returning position 2D, the polarity of the power source for the motor M2 changes, and then, the motor M2 rotates in the return direction.

Therefore, the arm 2 swings in the opposite direction, i.e. counterclockwise as shown by an arrow 2E in FIG. 3, to return to the original starting position 2B. During those motions, the angular speed of the arm 2 is almost constant, since the arm 2 is driven by the motor of the reciprocal rotary actuating mechanism, through control cables or directly (or through a reduction gear) without utilizing any quadric chain machanism.

Figure 6:
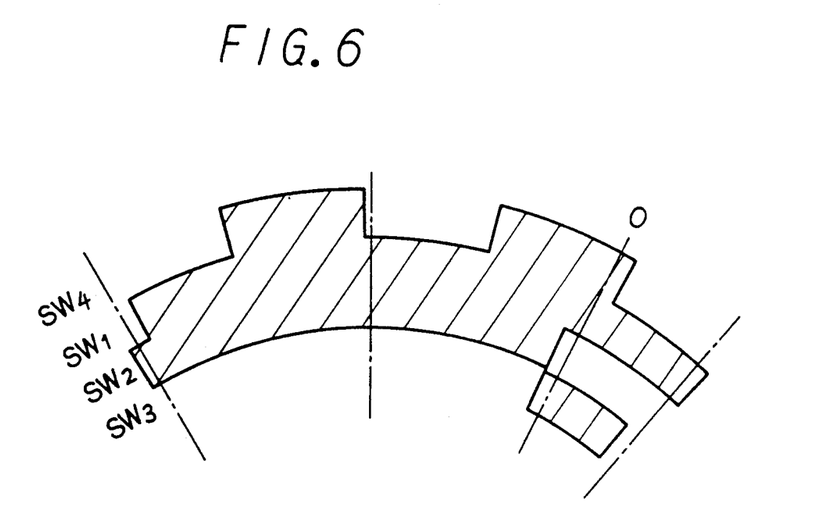

The stop positions 2B, 2D are detected every time by a detector, for example, comprising a contacting point between an electrode plate and a brush shown in FIG. 6, or a rotary douser and a photoelectric switch.

The detector is a device for changing the polarity of the input power of the motor M2 of the reciprocal rotary actuating mechanism. In addition the detector detects the position of the arm immediately before the arm comes to the stop positions every time in order to cause a regenerating braking function of the motor M2.

During the motions of the arm 2 to swing in left-and-right directions by the motor M2, the sliding actuating mechanism 6 is driven for reciprocal motion synchronous with the motions of the arm 2, so that the sliding member 3 retracts to the minimum length when the arm 2 comes to the positions of 2B, 2C and 2D, and expands to the maximum length when the arm 2 comes to the positions 1B and 1C.

Therefore, a wiper blade 7 fixed on the sliding member 3 can sweep a wide area including both upper corners S of the windshield 8.

Alternatively to the instant embodiment, the reciprocal rotary actuating mechanism and the sliding actuating mechanism 6 may be adjusted so that the velocity of the top end of the wiper blade 7 (resultant of the velocity of radial direction and the velocity of circumferential direction) is almost constant.

Hereinafter, referring to FIGS. 4 to 6, an embodiment of electric circuit for synchronizing the motor M2 of the reciprocal rotary actuating mechanism and the motor M1 of the sliding actuating mechanism so as to sychronize the reciprocal swing motion of the arm 2 and the reciprocal sliding motion of the sliding member 3 is explained.

Figure 4:
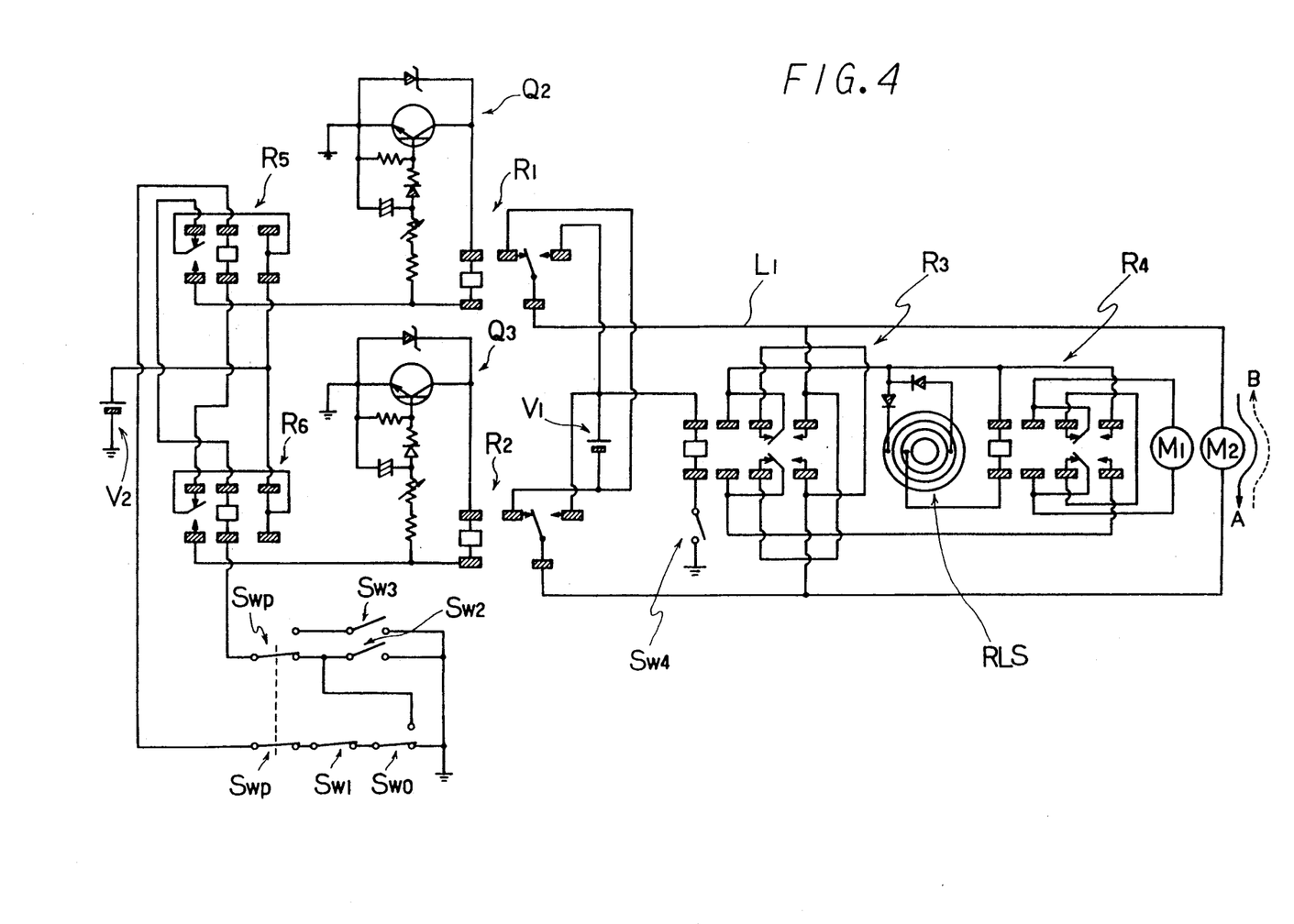
FIG. 4 is an electric circuit diagram showing an embodiment of the wiper actuating mechanism of the present invention.

The right half of FIG. 4 shows a power part for the motors M1, M2, and the left half shows a control part for controlling the power part.

The mark M1 in the power part designates a motor of a sliding actuating mechanism, while the mark M2 designates a motor of a reciprocal rotary actuating mechanism. The mark V1 designates a power source of direct current.

Between the motor M1 and the power source V1, there are provided contacts (output contacts) of the first relay R1 and the second relay R2. Each relay R1, R2 has a solenoid which is ON/OFF-operated by the control part. Both terminals of the motor M2 are connected with common-terminals of those contacts. That is, the positive terminal of power source V1 is connected to the respective a-contact (make-contact) of the relays R1, R2, and the negative terminal is connected to each b-contact (break-contact) of the relays R1, R2.

In the state of FIG. 4, both relays R1, R2, are made OFF, and the motor M2 rests.

When only the first relay R1 becomes ON from the above-mentioned state, an electric current flows in the direction of the arrow A in the motor M2, and on the other hand, when only the second relay R2 becomes ON, and electric current shown by the arrow B flows. If both relays R1, R2 happen to become ON, any electric current do not flow since both terminals come to the same phase or polarity.

Further, when the rotating motor M2 stops, i.e. when one of the relays in elected state becomes to OFF, the electric circuit L1 becomes to a closed circulating circuit, and a regenerative braking function is performed.

Both terminals of the motor M1 for a sliding member are connected to the power circuit L1 of the motor M2 through another relays R3, R4.

That is to say, firstly both terminals or electrodes of the motor M1 are connected to two common terminals of the relay R4, and the two b-contacts of the relay R4 are short-circuited each other in order to make regenerative braking circuit. Further the two a-contacts of the relay 4 are connected to two common terminals of the relay R3, respectively, and two a-contacts and two b-contacts of the relay R4 are connected so as to cross each other.

One of terminals of a solenoid of the relay R4 is directly connected to the b-contact of the abovementioned relay R3, and the other is connected to the b-contact through a rotary limit switch RLS. The rotary limit switch RLS is adjusted to operate immediately before the sliding member comes to the stroke ends in order to cause a regenerative braking function to the motor M1.

Further, one of terminals of a solenoid of the relay R3 is connected to a positive terminal of the power source V1, and another terminal is connected to the earth through a switch SW4.

The relays R3, R4 are devices to control the polarity of the motor M1, i.e. expansion and contraction of the sliding member.

Figure 5:
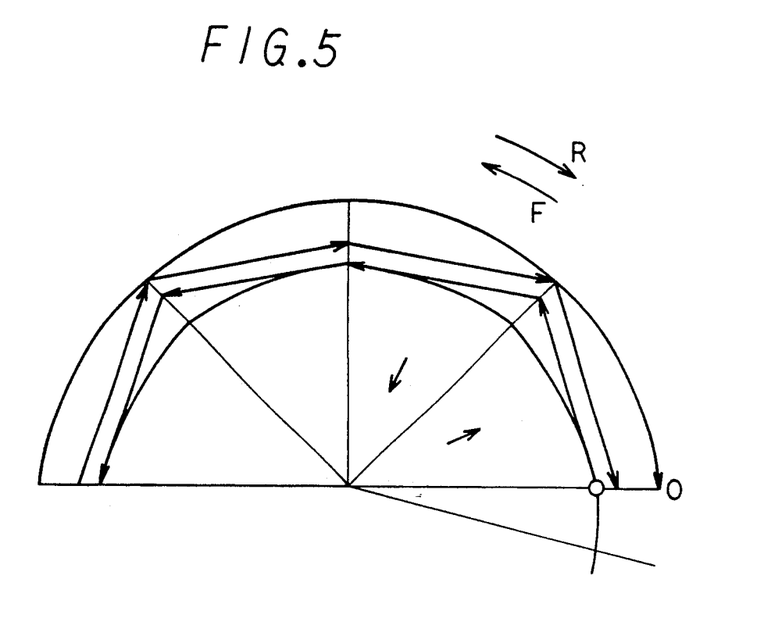
FIG. 5 and FIG. 6 are illustrations showing examples of positions of an arm and switches, respectively, controlled by the electric circuit shown in FIG. 4.

That is to say, it can be easily understood by comparing FIG. 5 and FIG. 6 that the motor M1 rotates in the ordinary direction when the switch SW4 turns to ON under condition that the motor M2 rotates in the ordinary direction (the electric line L1 is in the positive polarity, the electric line L2 is in the negative polarity, and the current flows as shown by the arrow F directing left). Then the sliding member extends. While the switch SW4 is turned to OFF under the same condition, the sliding member contracts.

On the contrary, under the condition that the motor M2 rotates in the opposite direction, the sliding member contracts when the switch SW4 turns to ON, and extends when turns to OFF.

The switch SW4 is such a device that turns to ON or OFF in accordance with the angular position of the arm. That is, as shown in FIG. 5, the switch SW4 becomes to ON in the ranges of $0-\frac{1}{8}$, $\frac{1}{4}-\frac{3}{8}$, $\frac{5}{8}-\frac{3}{4}$ and $\frac{7}{8}-1$ of a cycle, and becomes OFF at the remaining positions.

The mark V2 of the control part is a direct current power source, and the positive terminal is connected to common terminals of the relays R5 and R6.

A b-contact of the relay R5 is connected to the earth through a solenoid of another relay R6, a parking switch SWp and a switch SW2. The a-contact of the relay R5 is connected to the solenoid of the relay R1 of the above-mentioned power circuit and a timer Q2. The timer Q2 is a device for preventing a short-circuit when the relay is turned and for setting an interval time.

A b-contact of the relay R6 is connected to the earth through the solenoid of the relay R5, another contact of the parking switch SW$_p$, a switch SW1 and an ON-OFF switch SE$_0$. While, the a-contact is connected to a solenoid of the relay R2 of the power part and a timer Q3.

In the above-mentioned construction, when only the switch SW1 is turned, the relay R5 operates to rotate the motor M1 in the ordinary direction through the relay R1. Next, even through the switch SW2 is turned, no electric current flow in the solenoid of the relay R2, since the relay R5 is already turned, and the relay R1 continuously acts.

After that, the switch SW1 becomes OFF at the position of $\frac{1}{2}$ cycle of the arm (the position where the arm is turned half), and the motor M2 stops, and the relay R2 is turned after the timer comes up to flow electric current through the solenoid of the relay R6. Therefore, the relay R2 is turned, and the motor M2 rotates in the opposite direction. Further, the reciprocal motions of the arm continues as mentioned above till the parking switch SW$_p$ is turned off or the ON-OFF switch SW$_0$ is turned off.

One of the parking switches SW$_p$ is a change-switch, and when the parking switch SW$_p$ is turned off, the motor M2 rotates in the opposite direction to retract the arm into the predetermined parking space. Then, the switch is turned off at the rest position in order to stop the motor M2 and the arm.

The above-mentioned relation between the ON-OFF states of the switches and the positions of the arm are shown in the following Table 1.

TABLE 1

|     | $\frac{1}{2}$ cycle | $\frac{1}{4}$, $\frac{3}{4}$ cycle | 0 cycle | parking |
| --- | --- | --- | --- | --- |
| SW1 | OFF | ON | ON | ON |
| SW2 | ON | ON | OFF | OFF |

TABLE 1-continued

|     | $\frac{1}{2}$ cycle | $\frac{1}{4}$, $\frac{3}{4}$ cycle | 0 cycle | parking |
| --- | --- | --- | --- | --- |
| SW3 | OFF | OFF | ON | OFF |

Hereinafter, an embodiment of the wiper actuating mechanism of the present invention is explained.

A reciprocal rotary actuating mechanism shown in FIG. 1 comprises a direct current motor capable of rotating in both directions and a reduction gear N connected to an output shaft of the motor M2. Though the kind or type of the reduction is not limited in the present invention, a diference reduction gear or a worm-and-wormwheel gear can be preferably employed. The angular speed of the output shaft is generally about 2.6 to 3.5 radian per second.

Figure 7:
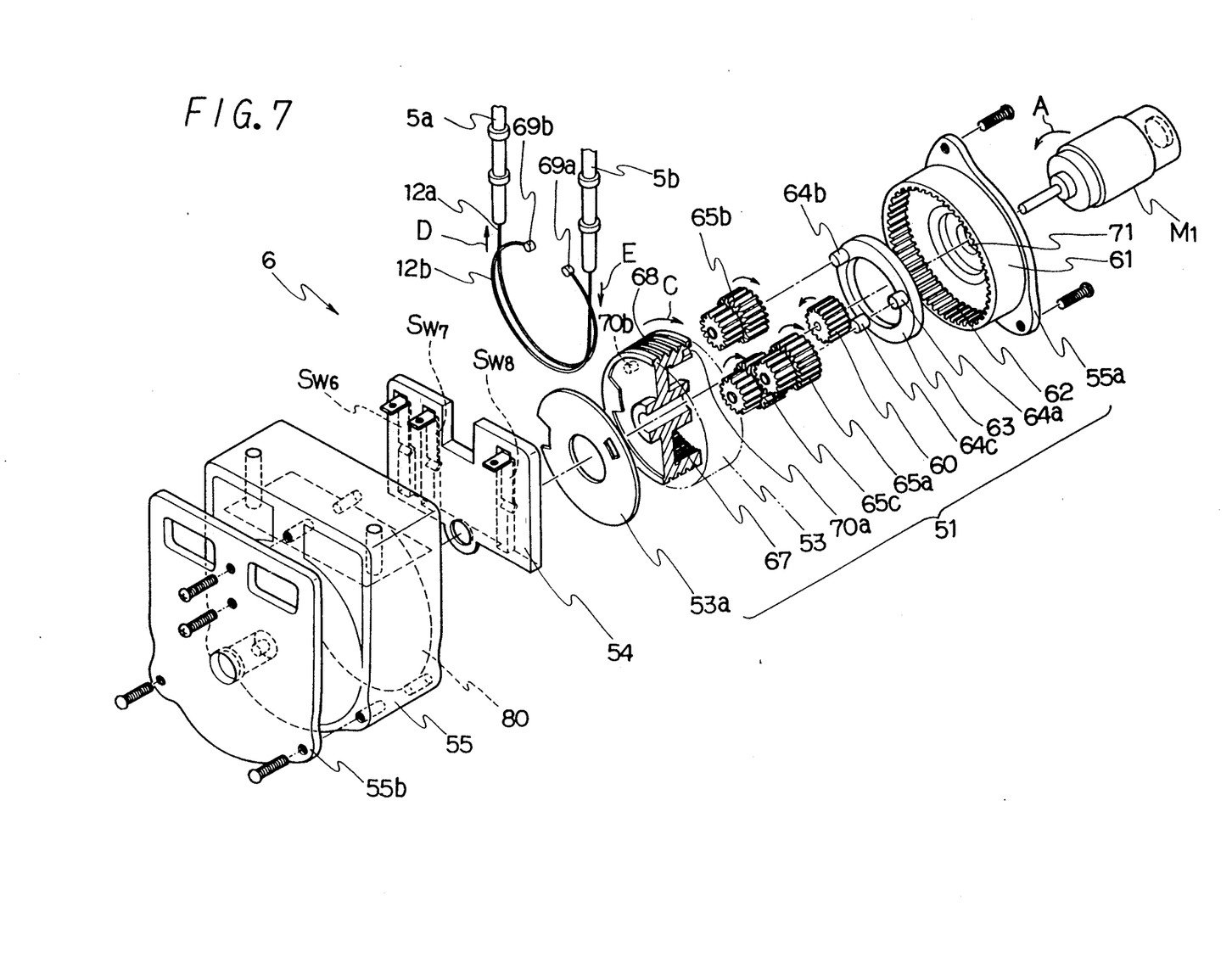
FIG. 7 is a perspective view showing an embodiment of a sliding actuating mechanism of the present invention.

Next, referring to FIG. 7, a preferable embodiment of a sliding actuating mechanism used in the present invention is explained.

Referring to FIG. 7, the numeral 55 shows a housing provided with a cylindrical hole at the center thereof, and the mark M1 shows a motor fixed to a bracket 55a covering a part of the housing 55. In the housing 55, a reduction gear 51, a pulley 53 for output, a wiring base or wiring board 54, contacts, and the like are contained.

At the periphery portion of the pulley 53, each end of the above-mentioned inner cores 12a, 12b of the control cables 5a, 5b is engaged.

Firstly, the reduction gear 51 will be explained. The reduction gear 51 has a sun gear 60 fixed around the output shaft of the motor M1. The bracket 55a on which the motor M1 is fixed has a through hole or opening 71 having a center extending in the axial direction, and a cylinder-like or ring-like projection 61 is provided at the inside surface of the bracket 55a. The inner peripheral surface of the projection 61 is provided with a rest-side internal gear 62.

Further, the above mentioned output pulley 53 is rotatably supported in coaxial state with the cylindrical projection 61, and a rotary-side internal gear is formed at the inside peripheral surface of the pulley 53. In the cylindrical space between the sun gear 60 and the internal gears 62, 67, three planet gears 65a, 65b, 65c are situated so as to be in contact with those gears 60, 62, 67.

There is provided some difference (e.g. nine teeth) between the teeth numbers of the rest-side internal gear 62 and the rotary-side internal gear 67. Therefore, a differential reduction gear 51 is made of the internal gears 62, 67, the sun gear 60 and the planet gears 65a, 65b, 65c. The above-mentioned three planet gears are supported by pins 64a, 64b, 64c of a carrier 63 so that each gear can rotate around the axis thereof and revolute around the sun gear 60.

Hereinafter, operations of those gears driven by the motor M1 which rotates counterclockwise (in the direction of arrow A) when the motion is seen from the direction of arrow B.

When the motor M1 rotates anti-clockwise (in the direction of arrow A), the sun gear 60 also rotates counterclockwise. Therefore, the three planet gears 65a, 65b, 65c rotate clockwise around the axis thereof while revoluting counterclockwise, since the planet gears are meshed with the sun gear 60 and the internal gears 62, 67. Then the rotary-side internal gear 67 slowly rotates clockwise (in the direction of arrow C) with a large reduction ratio based on the difference between the teeth numbers of rotary-side internal gear and the rest-side internal gear 62.

On the other hand, when the motor M1 rotates clockwise, the rotatable internal gear 67 rotates counter clockwise.

Hereinafter, a construction of the pulley 53 as an output member is explaned.

The pulley 53 has a cable groove 68 at the peripheral surface thereof, and has recessed portions 70a, 70b at a side surface thereof for holding anchors 69a, 69b of the inner cores 12a, 12b of the control cables 5a, 5b.

Each end of the inner core 12a, 12b is connected to the pulley 53 by engaging the anchore 69a, 69b into the engaging recessed portion 70a, 70b, and the end portions of the inner cores are wrapped around the pulley along the cable groove 68 so as to extend in the directions opposite each other, and further, extend in the tangential directions. Therefore, an output mechanism for converting reciprocal rotary motions of the pulley 53 into reciprocal linear motions of the two inner cores 12a, 12b is obtained.

Further, the pulley 53 has a circular electrode plate 53a fixed on a lateral side of the pulley 53. The electrode plate 53a has arc-shaped notches or cut portions K1 and arc-shaped holes K2 arranged concentrically with the plate. The electrode plate 53a and brush-like contacts SW6, SW7, SW8 provided on the wiring base or wiring boad 54 provide a rotary limit switch (RLS in FIG. 4) for detecting expanding-and-contracting ends of the sliding member.

Under the above-mentioned construction, for example, when the internal gear (i.e. also pulley 53) rotates in the direction of arrow C, one of inner cores 12a is driven in the direction of arrow D, while another inner core 12b is driven in the direction of arrow E.

Therefore, when the above-mentioned motor M1 repeats to reciprocally rotate clockwise and counterclockwise, the inner cores 12a, 12b circulate in both directions reciprocally to drive the sliding member (3 in FIG. 1) of the window wiper along the arm with reciprocal and intermittent movement.

In addition, the same reciprocal driving mechanism as for the sliding mechanism mentioned above can be employed for a reciprocal rotary actuating mechanism. That is to say, the wiper arm 2 can be reciprocally driven with a motor M2 capable of reciprocally rotating clockwise and counterclockwise, through a pair of reciprocally circulating inner cores 12c, 12d.

Hereinafter, referring to FIGS. 8 and 9, another embodiment of the window wiper of the present invention will be explained.

Figure 9:
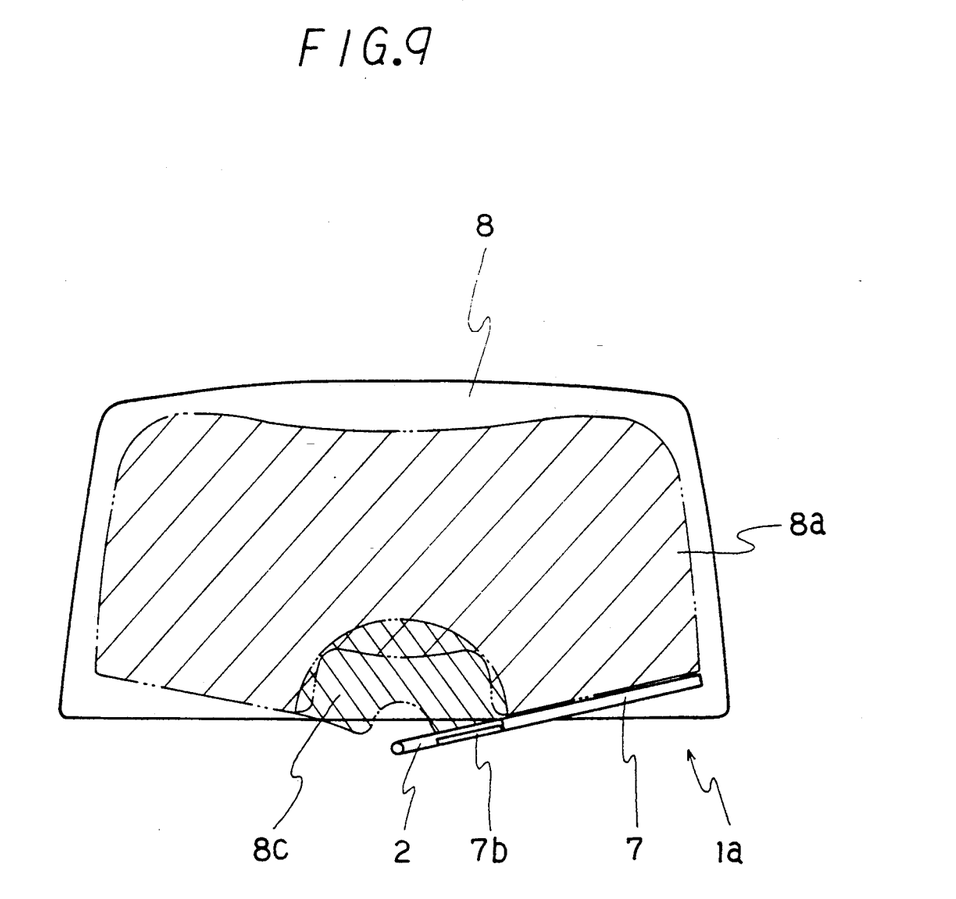
FIG. 9 is a schematic view showing an area swept by the wiper of FIG. 8.

In the window wiper 1 shown in FIG. 1, the wiper blade 7 can sweep over a fan-shaped area 8a of FIG. 9. That is to say, in the wiper of FIG. 1, the wiper blade 7 shifts toward the top of the arm at ⅛, ⅜, ⅝ and ⅞ cycle of the motion of the arm, and therefore, a rectangular area 8b remains without being swept at a bottom center portion of the windshield, and the visibility becomes poor.

Figure 8:
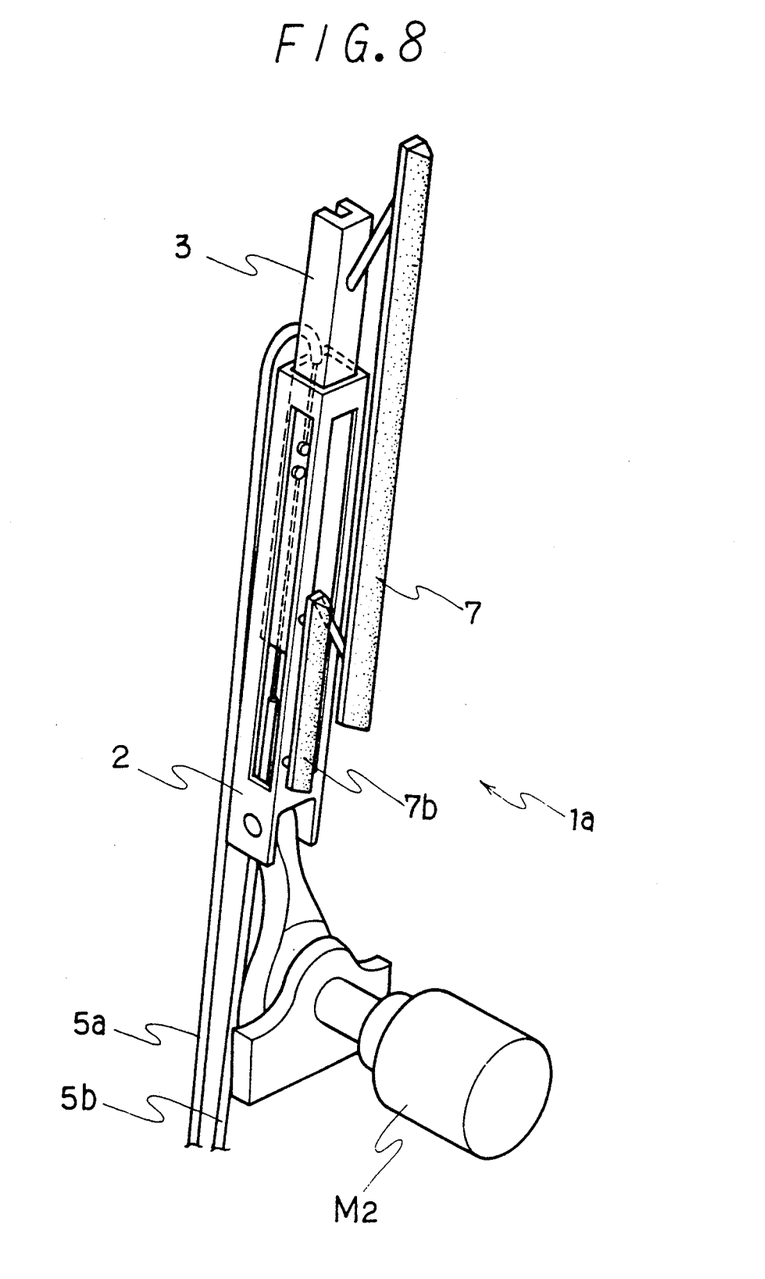
FIG. 8 is a perspective view showing another embodiment of the window wiper of the present invention.

The window wiper 1a shown in FIG. 8 is provided for eliminating such disadvantage.

As shown in FIG. 8, the wiper 1a has not only a movable wiper blade 7 fixed on the sliding member, but also has an additional non-movable wiper blade or fixed wiper blade 7b fixed at the lower end portion of the arm.

Therefore, when the arm swings reciprocally, the fixed blade 7b can sweep over the portion 8c of the windshield shown in FIG. 9, and good visility can be obtained without remaining the unswept portion 8b.

The reciprocal rotary actuating mechanisms of the wiper actuating mechanisms of the present invention can be employed not only in an expandable wiper, but also in a non-expandable ordinary window wiper. The present invention includes such non-expandable window wiper having the reciprocal rotary actuating mechanism and an electric circuit for controlling the machanism.

By applying the window wiper of the present invention, the maximum angular speed of the arm can be reduced since the arm is reciprocally driven by a reciprocally rotatable electric motor. Then, rain drops do not splash over walkers. Further, since the reciprocal sliding motion of the sliding member is provided by means of a sliding mechanism through flexible control cables, the arm becomes light, excess space is not required, noise is reduces, water-proof property is good and freedom or selectability of layout or arrangement of the devices becomes high.

Though several embodiments of the present invention are described above, it is to be understood that the present invention is not limited to the abovementioned embodiments, and various changes and modifications may be made in the invention without departing from the spirit and scope thereof.

What we claim is:

1. A window wiper assembly comprising:
   an elongated arm having a first end portion which is rotatably supported for rotation about a pivot axis near a window glass, and a second end portion opposite said first end portion;
   an elongated sliding member mounted on the arm in a slidable manner along the arm;
   a wiper blade fixed to the sliding member;
   a first control cable means for sliding said sliding member with said wiper blade along said arm, said first control cable means including an elongated cable having first and second elongated end portions, each end portion is defined by a conduit with an inner core slidably inserted therein, each inner core having a free end extending from the conduit, wherein said first end portion is generally linear along its extent thereof and extends generally radially from said axis along the arm, wherein said respective inner core free end is connected to the sliding member, said second end portion extending generally linear and radially from said axis along the arm and is looped around the second end portion of said arm, wherein the respective inner core free end is connected to the sliding member;
   a reciprocal rotary actuating means coupled to the arm for actuating the arm, said rotary actuating means including a second control cable means to reciprocally rotate said arm about said axis so as to have said arm travel over a predetermined wiping stroke on said window glass; and
   a slide-actuating means coupled to the inner cores of the first control cable means for reciprocally driving the inner cores and said sliding member,
   wherein the slide-actuating means and the rotary actuating means include harmonizing means for harmonizing the operations of said slide-actuating means and said rotary actuating means such that said sliding member and said wiper blade extend and retract along the arm in a predetermined manner corresponding to the position of the arm throughout said stroke.

2. The window wiper of claim 1, wherein the reciprocal rotary actuating means reciprocally rotates the arm at a substantially constant angular speed traversing along the window glass.

3. The window wiper of claim 1, wherein the reciprocal rotary means and the sliding actuating means reciprocally rotate and drive, respectively, the wiper blade at substantially constant speeds.

4. The window wiper of claim 1, further comprising an additional wiper blade fixed to the arm.

5. The window wiper of claim 1, wherein said reciprocally rotary actuating means comprises a rotary shaft fixed to said first end portion of the arm, defining said axis, a first pulley fixed to said rotary shaft, a second pulley reciprocally rotated with an electric motor and a reduction gear, and said second control cable means coupling the first and second pulleys.

6. The window wiper of claim 1, wherein said slid actuating means comprises a pulley wrapped with the inner cores around a periphery thereof and a reciprocally rotatable electric motor for reciprocally driving the pulley.

* * * * *